UNITED STATES PATENT OFFICE.

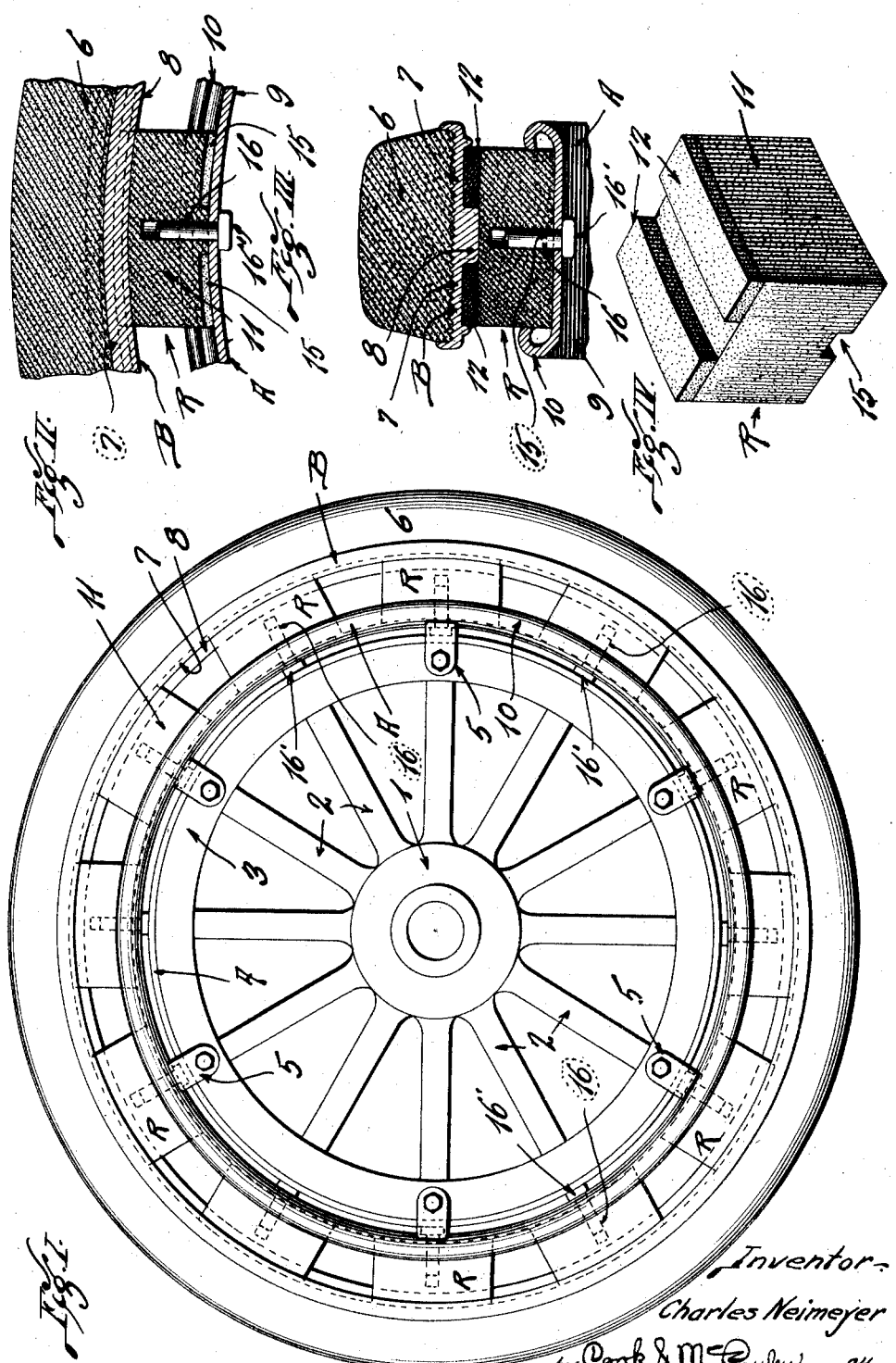

CHARLES NEIMEYER, OF LITTLE ROCK, ARKANSAS, ASSIGNOR TO DEMOUNTABLE SPRING TIRE COMPANY, OF ST. LOUIS, MISSOURI, A CORPORATION OF MISSOURI.

RESILIENT WHEEL.

1,401,431.     Specification of Letters Patent.     Patented Dec. 27, 1921.

Application filed August 16, 1920. Serial No. 403,902.

*To all whom it may concern:*

Be it known that I, CHARLES NEIMEYER, a citizen of the United States of America, and a resident of Little Rock, in the county of Pulaski and State of Arkansas, have invented certain new and useful Improvements in Resilient Wheels, of which the following is a full, clear, and exact description, reference being had to the accompanying drawings, forming a part of this specification.

My invention relates to improvements in resilient wheels, and more particularly to a resilient wheel having shock absorbing members interposed between inner and outer wheel rims. One object of the invention is to improve the shock absorbers, which are in the form of resilient clutches adapted to creep along an annular track on one of the rims, thereby permitting the inner rim to turn faster than the outer rim. With this object in view, each of the resilient clutches preferably consists of a simple rubber block having a yielding shock-absorbing portion, and a relatively hard portion frictionally engaging the annular track and adapted to creep circumferentially thereof. The hard portion of the rubber is well adapted to withstand the friction to which it is subjected at the annular track, and a further advantage results from the fact that this rubber will creep silently on the metal track. The yielding portion of the rubber serves as a shock absorbing element, and it is assembled between the rims under pressure, so as to firmly force the relatively hard rubber into frictional engagement with the annular track. To obtain the desired strength and simplicity, the different rubber elements are preferably formed integral with each other, each of the rubber clutches being a single block of rubber having a yielding portion and a relatively hard portion.

Another object of the invention is to produce a wheel having rubber clutches of this kind adapted to coöperate with an annular rib on the annular track, so as to prevent lateral displacement of the clutches. The hard rubber elements are preferably separated from each other to receive the annular rib, and said rib does not in any way prevent the discharge of dirt, rocks and the like, from the annular track on which the clutches travel.

Figure I is a side elevation of a vehicle wheel embodying the features of this invention.

Fig. II is an enlarged fragmentary section, illustrating one of the yielding clutches between the inner and outer rims.

Fig. III is a transverse section taken approximately through the center of the structure shown in Fig. II.

Fig. IV is a perspective view of one of the rubber blocks.

The wheel shown in Fig. I comprises a hub 1, spokes 2, a felly 3 and a metal band 4 surrounding the felly to receive a demountable rim. 5 designates fastening devices of a well known type adapted to secure a demountable rim to the wheel. The wheel is thus equipped to receive a demountable rim, and it may be considered as a standard automobile wheel.

The resilient demountable tire comprises an inner rim A adapted to be secured by the fastening devices 5, an outer rim B surrounding said inner rim, and a rubber tire 6 which is preferably vulcanized on the outer rim.

The outer rim B also includes a continuous unobstructed annular track 7 facing the inner rim, and an annular retaining rib 8 extending from the middle portion of said annular track so as to divide said track into two annular track elements, one at each side of said annular retaining rib 8.

The inner rim A may be in the form of a channel consisting of an annular web 9 and annular side flanges 10 extending from said web. If desired, this rim A may be the standard rim of the type ordinarily used with pneumatic tires of the clencher type.

An annular row of resilient expanding clutches is arranged circumferentially of the annular track 7 and interposed between the inner and outer wheel rims to form a yielding frictional connection which allows the inner rim to turn, or creep, relative to the outer rim. Each of these resilient clutches preferably consists of a rubber block R having a yielding rubber shock absorbing element 11 and relatively hard rubber elements 12 which frictionally engage the annular track 7 at opposite sides of the retaining rib 8.

The hard rubber elements 12 are separated from each other to form a recess for the annular retaining rib 8, and said hard rubber elements contact with the side faces of rib 8 to prevent lateral displacement of the rubber blocks.

An advantage is gained by using two separate hard rubber ribs 12 which do not extend across the rib 8, for the hard rubber is comparatively brittle and a single piece of hard rubber extending across the rib 8 would be liable to breakage in service. In other words, a hard rubber bridge extending across and contacting with rib 8 as well as with the annular tracks at opposite sides of the rib, would be liable to break in response to the pressure tending to force the hard rubber onto the rib 8 and also onto both tracks 7.

In making the rubber block, a body of raw rubber is molded to form the yielding element 11, and separate bodies of raw rubber are molded to form the harder elements 12. These bodies of raw rubber are then assembled as shown in Fig. IV. It is to be understood that the bodies of raw rubber are compounded differently, so that the rubber elements 12 will become comparatively hard when vulcanized with the rubber element 11. The vulcanizing operation will integrally connect the two different rubber elements, and the finished article will be a single block of rubber having a yielding shock absorbing portion 11 and harder portions 12 which serve as friction elements and which also coöperate with rib 8 to prevent lateral displacement. To enable the rubber element 11 to yield more freely, recesses 15 are preferably formed in the base of this rubber element.

The rubber blocks R are assembled between the rims under pressure, and theoretically the pressure exerted by the rubber should be great enough to support the normal load of the vehicle, but in actual practice the inner rim may be forced downwardly a slight distance by the weight of the vehicle and its contents so as to occupy a position eccentric to the outer rim. If the initial, or normal, pressure of the rubber is great enough, the load will be supported by the wheel without further displacement or bending the rubber, and in this event the bodies of rubber will not be subjected to injurious constant flexure when the vehicle is traveling over a smooth roadway.

At the upper portion of the wheel, the friction clutches formed by the rubber blocks are comparatively free, and there being no positive driving connection between the inner and outer rims, the free individual resilient clutches are permitted to move or creep circumferentially of the annular track 7. In one revolution the circumferential slippage is very slight, but in traveling several miles the total slippage may amount to one or more complete revolutions, depending upon the conditions under which the wheel is driven.

By using the rib 8 to prevent lateral displacement, I also prevent dirt, sand, rocks and other objects from remaining in the space between the rims. Centrifugal force will throw such objects outwardly from the inner rim, and the retaining rib 8 will not interfere with the discharge of rocks, and the like, from the annular track 7.

The radial pins 16 are removably mounted in the inner rim, so the blocks of rubber can be easily assembled in the space between the inner and outer rims. Each pin 16 passes through a hole in the inner rim, and when the rim is applied to a wheel, a head 16' on each pin lies between the inner rim and the metal band 4 on the felly. The heads 16' are thus confined between the inner rim and the band 4 to retain the pins 16 in proper engagement with the rubber blocks when the tire structure is mounted on a wheel. In assembling the rubber blocks, the pins 16 are inserted after the blocks are mounted between the inner and outer rims, and it will be apparent that these pins can be easily removed to permit removal of the rubber blocks.

I claim:

1. A wheel having an inner rim, an outer rim surrounding said inner rim, one of said rims being provided with an annular track facing the other rim, and an annular row of resilient expanding rubber members arranged circumferentially of said annular track and interposed between said rims to form a yielding frictional connection between said rims, each of said resilient rubber members comprising relatively hard rubber ribs separated from each other and frictionally engaging said annular track and a yielding rubber element yieldingly connecting said separated hard rubber ribs and coöperating therewith to force the ribs onto said annular track.

2. A wheel having an inner rim, an outer rim surrounding said inner rim, one of said rims being provided with an annular track facing the other rim, and an annular row of resilient expanding rubber clutches arranged circumferentially of said annular track and interposed between said rims to form a yielding frictional connection which allows one of said rims to turn faster than the other, each of said resilient rubber clutches comprising a single block of rubber having a pair of relatively hard rubber elements separated from each other and frictionally engaging said annular track and a yielding, shock-absorbing rubber element extending entirely across said hard rubber elements and confined under pressure between said rims to force said hard rubber elements into engagement with said track, said hard rubber elements being integrally and yieldingly connected together through the medium of said yielding rubber element.

3. A wheel having an inner rim, an outer rim surrounding said inner rim, one of said rims being provided with an annular retaining rib facing the other rim, and shock absorbing devices interposed between said rims, each of said shock absorbing devices comprising a rubber block having a yielding rubber portion and a pair of relatively hard rubber portions separated from each other to form a recess for the reception of said retaining rib, whereby the shock absorbing devices are retained on their seats and prevented from moving transeversely of said retaining rib, said separated hard rubber portions being integrally and yieldingly connected together through the medium of said yielding rubber portion.

4. In a resilient wheel of the character described, an inner rim, an outer rim surrounding said inner rim, one of said rims having a continuous unobstructed annular track facing the other rim and an annular retaining rib extending from said annular track so as to divide said track into two annular track elements, one at each side of said annular retaining rib, and an annular row of resilient rubber clutches interposed between said rims to form a yielding frictional connection which allows the inner rim to turn faster than the outer rim, each of said resilient rubber clutches comprising a pair of relatively hard non-yielding rubber portions adapted to creep along said annular track elements and a yielding rubber portion formed integral with said hard rubber portions so as to yieldingly connect said hard rubber portions, said hard rubber portions being separated from each other to provide a recess for the reception of said annular retaining rib, whereby said rubber clutches are retained on said annular track elements.

In testimony that I claim the foregoing I hereunto affix my signature.

CHARLES NEIMEYER.